US 6,571,451 B2

(12) United States Patent
Satran et al.

(10) Patent No.: US 6,571,451 B2
(45) Date of Patent: Jun. 3, 2003

(54) METHOD FOR ASSEMBLING A METAL-CUTTING SLOTTING CUTTER (75) Inventors: Amir Satran, Kfar Vradim (IL); Yaron Eisen, Kfar Vradim (IL)

(73) Assignee: Iscar Ltd., Israel ( * ) Notice: Subject to any disclaimer, the term of this patent is extended or adjusted under 35 U.S.C. 154(b) by 0 days.

(21) Appl. No.: 10/256,783

(22) Filed: Sep. 30, 2002

(65) Prior Publication Data

US 2003/0029019 A1 Feb. 13, 2003

Related U.S. Application Data (63) Continuation of application No. 09/458,673, filed on Dec. 10, 1999, now Pat. No. 6,488,456.

(30) Foreign Application Priority Data

Dec. 29, 1998 (IL) .................................................. 127827

(51) Int. Cl.$^7$ .......................... B23P 11/02; B23C 1/00; B26D 1/12
(52) U.S. Cl. ........................... 29/447; 29/468; 29/508; 409/234; 407/40; 407/46
(58) Field of Search ........................ 29/447, 448, 456, 29/464, 468, 508, 515, 516, 525.01, 525.11; 409/234; 407/40, 46, 52; 403/273

(56) References Cited

U.S. PATENT DOCUMENTS

| 151,043 A | 5/1874 | Miller |
| 182,178 A | 9/1876 | Disston |
| 220,008 A | 9/1879 | Weaver |
| 411,189 A | 9/1889 | Grey |
| 1,357,030 A | 10/1920 | McCurrier |
| 1,762,111 A | 6/1930 | Weddell |
| 2,033,384 A | 3/1936 | Marshall ....................... 29/105 |
| 2,431,581 A | 11/1947 | Owen et al. .................. 29/103 |
| 2,598,649 A | 5/1952 | Rintoul ........................ 164/70 |
| 2,600,272 A | 6/1952 | Segal .......................... 143/133 |
| 2,828,672 A | 4/1958 | McMullen ...................... 90/1 |
| 2,989,800 A | 6/1961 | Comly ......................... 29/105 |
| 3,176,732 A | 4/1965 | Henderson ................... 143/133 |
| 3,309,756 A | 3/1967 | Segal ............................ 29/95 |
| 3,729,808 A | 5/1973 | Wolf et al. ................... 29/105 |
| 3,757,397 A | 9/1973 | Lindsay ....................... 29/105 |
| 4,061,076 A | 12/1977 | Robertson ....................... 90/11 |
| 4,204,787 A | 5/1980 | McCray et al. .............. 409/234 |
| 4,330,227 A | 5/1982 | Raye et al. .................... 407/36 |
| 4,456,408 A | 6/1984 | Glasow ......................... 407/35 |
| 4,522,538 A | 6/1985 | Lindsay ........................ 83/821 |
| 4,662,259 A | 5/1987 | Dutina ......................... 407/39 |
| 4,692,069 A | 9/1987 | Kieninger ..................... 83/821 |

(List continued on next page.)

FOREIGN PATENT DOCUMENTS

| CA | 1015246 | 8/1977 |
| DE | 880838 | 6/1953 |
| FR | 2443308 | 12/1978 |

OTHER PUBLICATIONS

American Mechanists' Handbook and Dictionary of Shop Terms by Fred H. Colvin and Frank A. Stanley; pp. 738; 780,390–391; 1292–1293; 1940.

The Shop Tool Manual; Arbor Sleeves and Spacing Collars; Adapters (End Mill Holders); 1960.

Shrink–Fit Toolholding; by M. Eastman; http://www.cuttingtoolengineering.com/article/view Apr. 1997; vol. 49; No. 3.

Primary Examiner—John C. Hong
(74) Attorney, Agent, or Firm—Pennie & Edmonds LLP (57) ABSTRACT A slotting cutter and a method for constructing the slotting cutter. The slotting cutter is structurally divided into two portions, a central adapter portion and a cutter portion. The central adapter portion is a disk with an F-type or S-type adapter. The cutter portion is an annular ring provided with cutting insert receiving pockets, or cartridge receiving pockets. The cutter portion and a body portion are manufactured separately and combined to form the slotting cutter by a heat shrinkage method.

39 Claims, 6 Drawing Sheets

U.S. PATENT DOCUMENTS

| | | | |
|---|---|---|---|
| 4,995,767 A | 2/1991 | Segal | 407/39 |
| 5,163,788 A | 11/1992 | Dahl et al. | 407/46 |
| 5,197,231 A | 3/1993 | Pedersen et al. | 51/204 |
| 5,393,174 A * | 2/1995 | Wawrzyniak | 407/51 |
| 5,582,494 A | 12/1996 | Cook | 409/234 |
| 5,662,436 A | 9/1997 | Bishop | 407/35 |
| 5,711,642 A | 1/1998 | Ball et al. | 409/234 |
| 5,788,426 A | 8/1998 | Daniels | 407/36 |
| 5,848,858 A | 12/1998 | Jager et al. | 407/34 |
| 5,979,912 A | 11/1999 | Cook | 279/102 |
| 6,012,372 A | 1/2000 | Laster et al. | 83/665 |

* cited by examiner

METHOD FOR ASSEMBLING A METAL-CUTTING SLOTTING CUTTER

RELATED APPLICATIONS

This is a Continuation of U.S. Patent Application No. 09/458,673, filed Dec. 10, 1999, now U.S. Pat. No. 6,488,456.

FIELD OF THE INVENTION

The present invention relates to slotting cutters and a method for constructing such slotting cutters.

BACKGROUND OF THE INVENTION

Slotting cutters can be left handed, right handed or neutral, depending on the location of cutting inserts on the slotting cutter's outer periphery. In addition they generally come with two different types of adapter, referred to herein both in the specification and claims as "S-type" and "F-type" adapters. An "S-type" adapter is a central opening centered at the slotting cutter's axis of rotation, designed to receive an arbor connected to a spindle. An "F-type" adapter is a generally cylindrical central protrusion at the slotting cutter's central opening constituting an arbor for connecting to a spindle.

A major problem in the cutting tool industry is that of supply time. Typically, the conventional supply time for a slotting cutter, from the time of order, is four to eight weeks. An obvious way of reducing supply time to an absolute minimum would be to manufacture all the various types of slotting cutters and store them. As soon as an order is placed by a client for a given number of slotting cutters, they are retrieved from storage and supplied to the client. However, taking into account the many types of slotting cutters that would have to be produced and stored (left handed, right handed and neutral, with either "S-type" or "F-type" adapters), such a simplistic approach has a disadvantage that it would place heavy demands both on storage space and financial investment.

It is an object of the present invention to provide slotting cutters and a method for producing such slotting cutters in which the supply time is considerably less than the conventional supply time and in which the aforementioned disadvantage is reduced.

SUMMARY OF THE INVENTION

In accordance with one embodiment of the present invention there is provided method for assembling a metal-cutting slotting cutter comprising:
  providing a body portion comprising a disk-like support member having a front face, an outer peripheral surface with a first diameter, and a central portion.
  providing a cutter portion comprising an annular ring having an inner surface with a second diameter and an outer portion provided with recesses;
  positioning the body portion inside the cutter portion; and
  inserting at least one screw into the front face of the support member, at an acute angle ($\alpha$) with respect to a normal to the front face, such that the screw emerges from the outer peripheral surface of the support member and engages a depression formed in the cutter portion, to thereby help secure the support portion to the cutter portion.

Typically, heat is applied to the cutter portion prior to positioning the body portion in the cutter portion.

Also, typically, the first diameter is larger than the second diameter.

The method may include inserting at least two, or even four, screws into the front face of the support member, each screw being inserted at said acute angle ($\alpha$) with respect to a normal to the front face and engaging a depression formed in the cutter portion.

The positioning step may include aligning a protrusion protruding from the outer peripheral surface of the support member with an indent formed on the inner surface of the cutter portion, and inserting the outer peripheral surface of the body portion into the annular ring of the cutter portion.

The method may further include mounting cutting inserts into the recesses.

The method may further include providing the recesses with cutting insert receiving cartridges, which may be secured with screws. The recessed may be provided with left-handed, right-handed, or both left- and right-handed cutting insert cartridges.

The method may further comprise mounting cutting inserts in the cutting insert receiving cartridges.

The method may comprise providing a body portion having a central portion provided with an S-type adapter, or with an F-type adapter.

In accordance with another embodiment of the present invention there is provided method for assembling a metal-cutting slotting cutter comprising:
  providing a body portion comprising a disk-like support member having a front face, an outer peripheral surface with a first diameter, and a central portion;
  providing a cutter portion comprising an annular ring having an inner surface with a second diameter and an outer portion provided with recesses;
  aligning a protrusion protruding from the outer peripheral surface of the support member with an indent formed on the inner surface of the cutter portion;
  inserting the outer peripheral surface of the body portion into the annular ring of the cutter portion to thereby position the body portion inside the cutter portion; and
  inserting a securing member into at least one bore formed in the support member to thereby help secure the support portion to the cutter portion, said at least one bore having a longitudinal axis that extends at an angle oblique to a rotary axis (R) of the body portion.

The method may further comprise applying heat to the cutter portion prior to inserting the outer peripheral surface of the body portion into the annular ring of the cutter portion. Furthermore, the first diameter may be larger than the second diameter.

The method may comprise inserting a securing member into each of at least two, or even four, separate bores formed in the support member, each bore having a longitudinal axis that extends at an angle oblique to a rotary axis of the body portion.

The securing member may be a screw that is inserted into the front face of the support member, at an acute angle ($\alpha$) with respect to a normal to the front face, such that the screw emerges from the outer peripheral surface of the support member and engages a depression formed in the cutter portion, to thereby help secure the support portion to the cutter portion.

The method may include forming a bore at the periphery of the support member, nd forcibly urging a pin into the bore formed at the periphery of the support member so that part of the pin protrudes beyond the support member's outer peripheral surface. The method may also include forming the support member with a radially extending lip.

BRIEF DESCRIPTION OF THE DRAWINGS

For a better understanding the invention will now be described, by way of example only, with reference to the accompanying drawings in which.

DETAILED DESCRIPTION OF THE INVENTION

Attention is drawn to the drawings, showing two basic types of slotting cutters, 10 and 12, that are differentiated by their adapters. In the following description the same reference numeral will be used to indicate identical features or elements of the two slotting cutters. Features or elements that are not identical but perform a similar function in each of the slotting cutters, will be referred to by the same name and will be designated by the reference numeral n with respect to the first type of slotting cutter and designated by the reference numeral n+100 with respect to the second type of slotting cutter.

Figure 1:
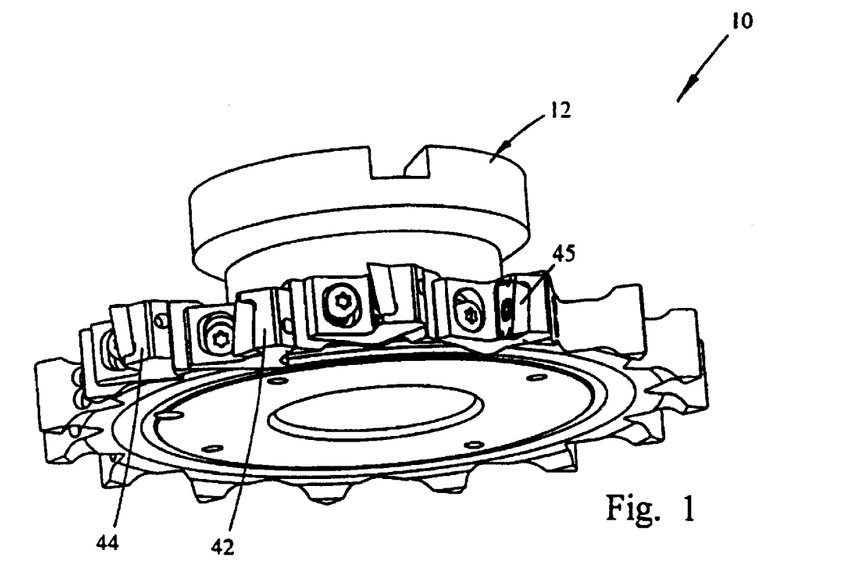
FIG. 1 is a perspective view of a slotting cutter with an F-type adapter.
Figure 2:
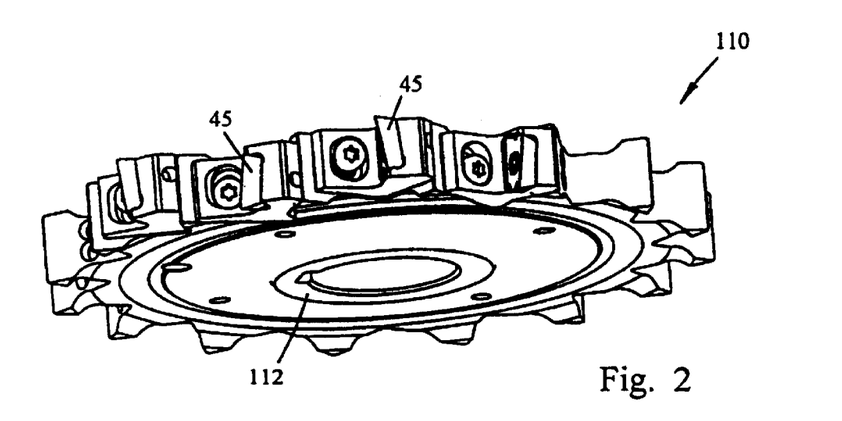
FIG. 2 is a perspective view of a slotting cutter with an S-type adapter.
Figure 3:
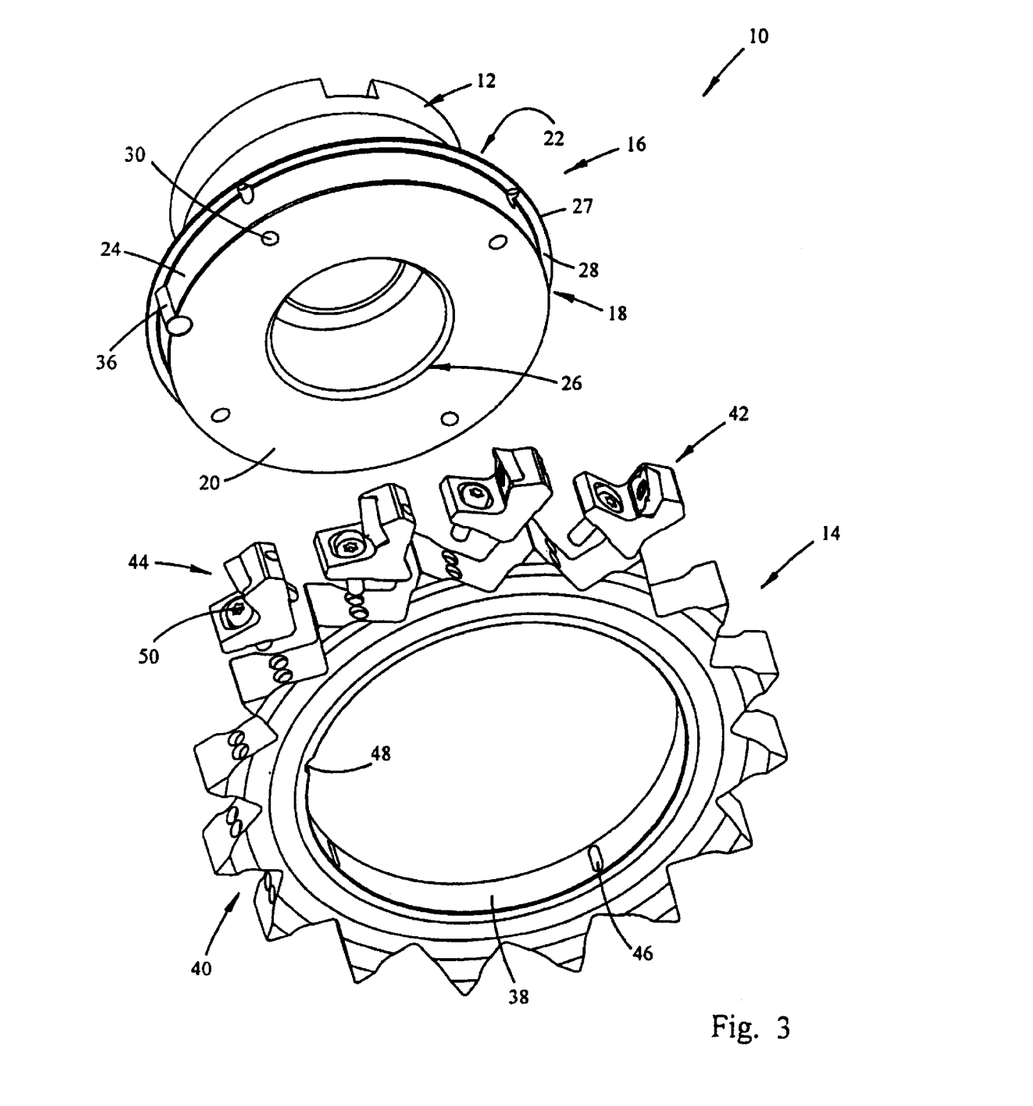
FIG. 3 is a perspective exploded view of a slotting cutter with an F-type adapter.
Figure 4:
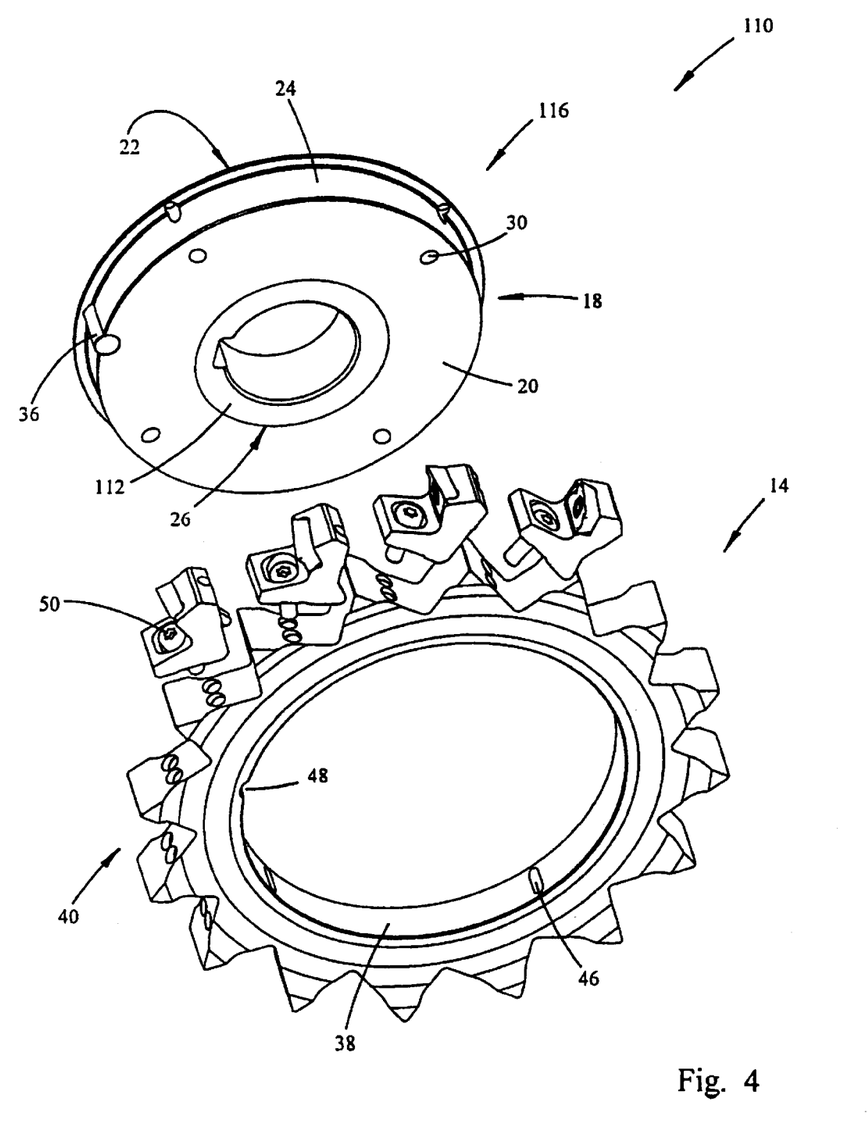
FIG. 4 is a perspective exploded view of a slotting cutter with an S-type adapter.
Figure 5:
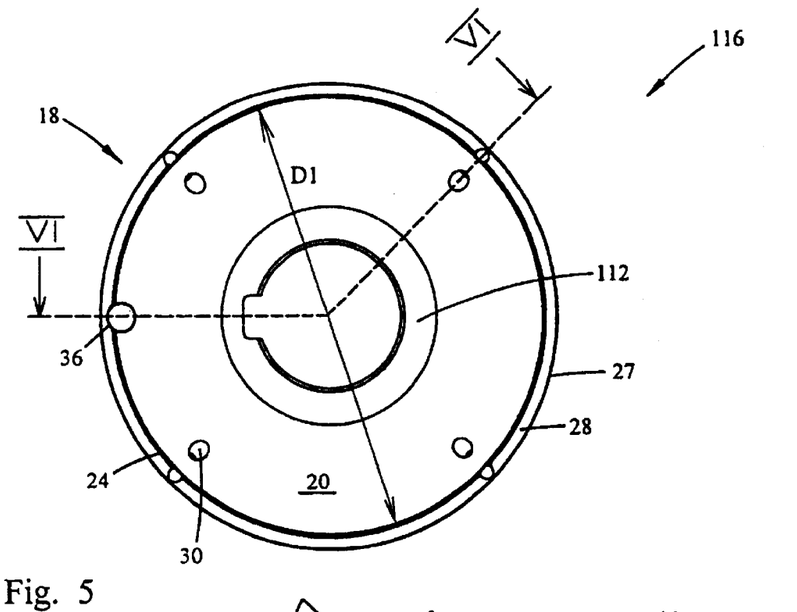
FIG. 5 is a side exploded view of a slotting cutter with an S-type adapter.
Figure 6:
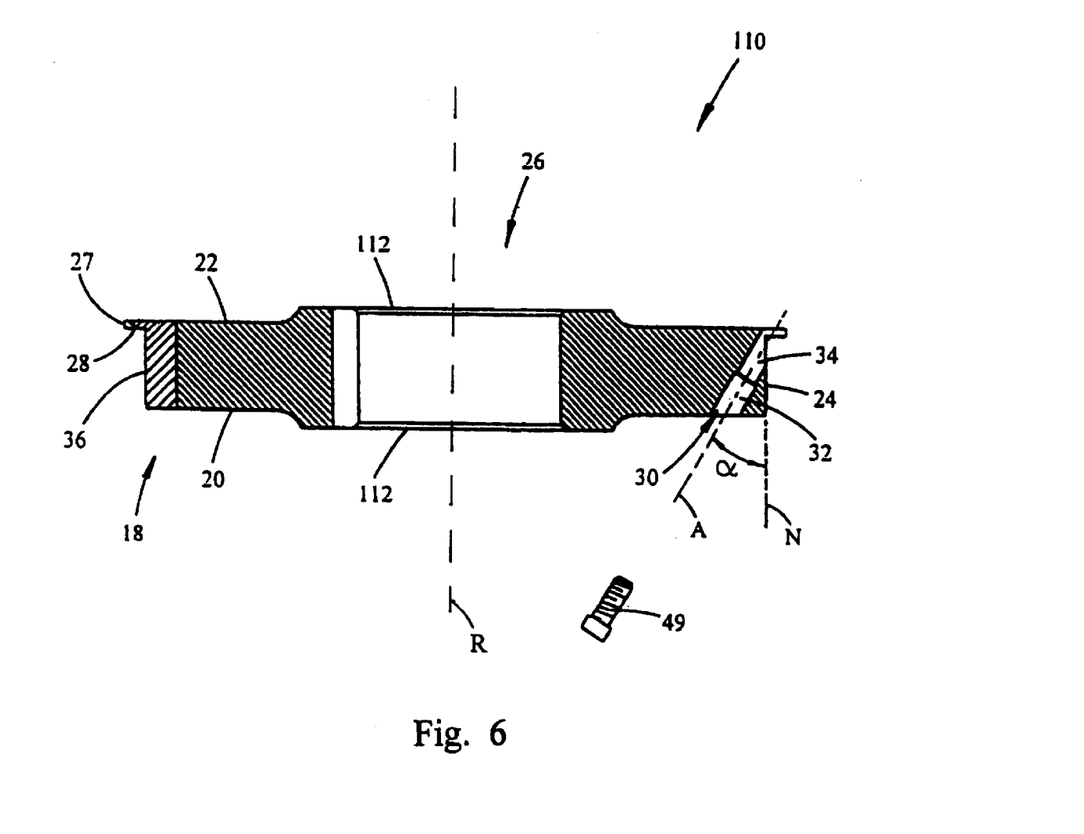
FIG. 6 is a sectional view indicated by the line VI-VI of FIG. 5.
Figure 7:
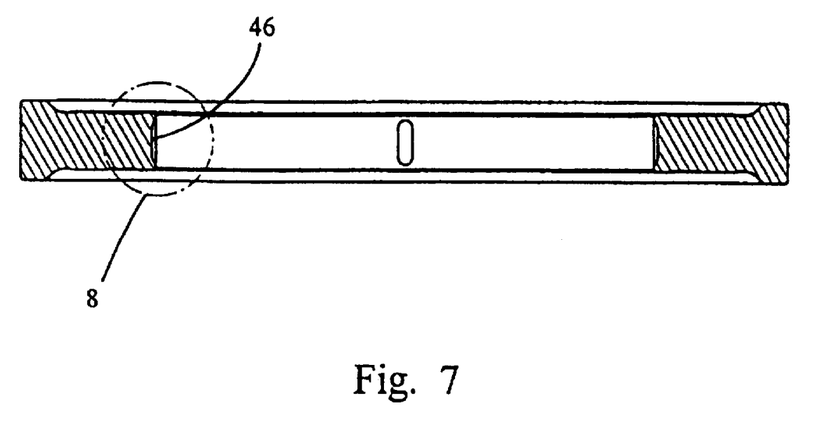
FIG. 7 is a sectional view indicated by the line VII-VII of FIG. 5.
Figure 8:
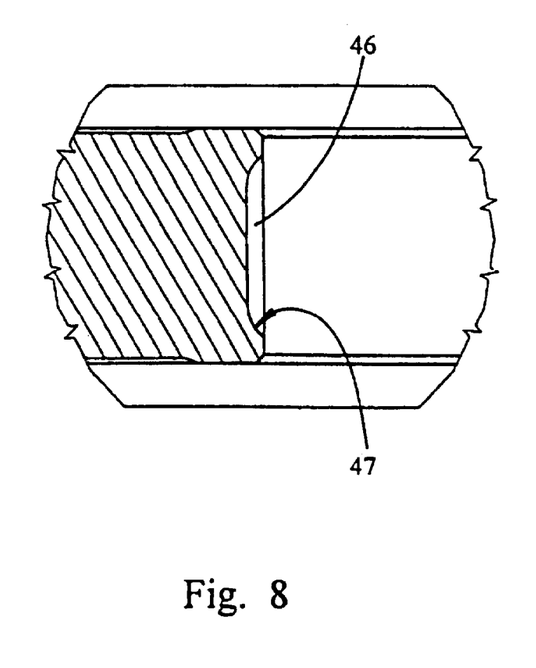
FIG. 8 is an enlarged detail of a portion of FIG. 7.

The first type of slotting cutter 10 has an F-type adapter 12 and will therefore also be referred to as an F-type slotting cutter. The second type of slotting cutter 110 has an S-type adapter 112 and will therefore also be referred to as an S-type slotting cutter. Each type of slotting cutter comprises a cutter portion 14 and a body portion 16 (116) which are manufactured separately and combined to form the slotting cutter by a heat shrinkage method, as will be described in greater detail below. The body portion 16 (116) comprises a disk-like support member 18 having front and rear faces 20 and 22, respectively, an outer peripheral surface 24 of diameter D1 and a central portion 26 provided with an adapter. The adapter 12 of the F-type slotting cutter 10 extends rearwardly from the rear of the support member 18, whereas the adapter 112 of the S-type of slotting cutter 110 is substantially of the same thickness as the support member 18, slightly protruding from the front and rear faces 20 and 22, respectively (see FIG. 6).

A thin lip 27, having a forwardly facing location surface 28, extends radially from the rear face 22 of the support member. Four countersunk through bores 30 extend from the front face 20 to the outer peripheral surface 24. In the drawings the countersunk through bores 30 are shown to continue on from the outer peripheral surface 24 to the lip 27. It should be noted that this is for convenience of production only. In principle, it is sufficient that the countersunk through bore 30 extend from the front face 20 to the outer peripheral surface 24 and at an angle oblique to a rotary axis (R) of the tool. Each countersunk through bore has a longitudinal axis A that makes an acute angle α with a normal N to the front face 20. Each countersunk through bore 30 has a forward countersunk portion 32 and a rear screw threaded portion 34. The support member 18 has a protrusion 36 protruding from the outer peripheral surface 24. The function of the countersunk through bores 30 and of the protrusion 36 will be described below with reference to an assembled slotting cutter. For convenience of production, the protrusion is manufactured by first forming a bore at the periphery of the support member and then forcibly urging a pin into the bore so that part of the pin protrudes beyond the outer peripheral surface 24.

The cutter portion 14 has the form of an annular ring having an inner surface 38 with a diameter D2 and an outer portion provided with recesses 40. The diameter D2 of the inner surface 38 of the cutter portion 14 is smaller than the diameter D1 of the outer peripheral surface 24 of the support member 18. Preferably, the recesses are cartridge receiving pockets for receiving cutting insert receiving cartridges. Either right-hand 42, left-hand 44, or both right-hand and left-hand insert receiving cartridges can be mounted in the recesses 40. However, the recesses 40 can also be designed as insert receiving pockets for directly mounting cutting inserts therein. The cutting inserts 45 can be of any desired design, with the cutting insert receiving cartridges accordingly designed.

The cutter portion 14 is provided with four depressions 46 on its inner surface 38, that are designed to mate with the four countersunk through bores 30 when assembling the slotting cutter. An indent 48 on the inner surface 38 of the cutter portion 14 is designed to mate with the protrusion 36 protruding from the outer peripheral surface 24 of the support member 18 of the body portion. The mating indent-protrusion combination provides a rotational securing arrangement that ensures that in the assembled slotting cutter the cutter portion 14 will not rotate relative to the body portion 16.

In accordance with the present invention, body portions 16 (116) and cutter portions 14 are manufactured separately and slotting cutters 10 (110) are constructed by affixing the cutter portions to the body portions using a heat shrinkage process. Heat is applied to a cutter portion 14 until its diameter D2 is greater than the diameter D1 of the support member. The support member 18 of the body portion 16 is then positioned inside the cutter portion 14, with the protrusion 36 engaging the indent 48, and urged toward the lip 27 until the cutter portion abuts the location surface 28. Clearly, the radial extension of the lip 27 has to be sufficient to ensure such abutment. The lip 27 has to be sufficiently thick so as to enable it to withstand any axial force applied to it by the cutter portion 14. As the cutter portion cools it contracts and becomes rigidly affixed to the body portion.

After assembling the slotting cutter as described above, a countersunk head screw 49 is placed in each countersunk through bore 30 and is screwingly engaged by the rear screw threaded portion 34. The countersunk head screw 49 is tightened until it engages the depression 46, on the inner surface 38 of the cutter portion 14, and abuts a rear section 47 of the depression. As the countersunk head screw is tightened it applies a force to the cutter portion 14, the axial component of which ensures that the cutter portion 14 is secured against axial movement relative to the body portion 16 in a direction away from the location surface 28. The angle α is preferably chosen to give rise to a maximal axial component of the force applied by the countersunk head screw.

Finally, right-hand 42 and/or left-hand 44 insert receiving cartridges are affixed, by means of screws 50, to the recesses 40 to complete the construction of the slotting cutter 10 (110).

Although the present invention has been described to a certain degree of particularity, it should be understood that various alterations and modifications can be made without departing from the spirit or scope of the invention as hereinafter claimed.

What is Claimed is:

1. A method for assembling a metal-cutting slotting cutter comprising:
   providing a body portion comprising a disk-like support member having a front face, an outer peripheral surface with a first diameter, and a central portion;
   providing a cutter portion comprising an annular ring having an inner surface with a second diameter and an outer portion provided with recesses;
   positioning the body portion inside the cutter portion; and
   inserting at least one screw into the front face of the support member, at an acute angle ($\alpha$) with respect to a normal to the front face, such that the screw emerges from the outer peripheral surface of the support member and engages a depression formed in the cutter portion, to thereby help secure the support portion to the cutter portion.

2. The method in accordance with claim 1, further comprising applying heat to the cutter portion prior to positioning the body portion in the cutter portion.

3. The method in accordance with claim 2, wherein the first diameter is larger than the second diameter.

4. The method in accordance with claim 3, comprising inserting at least two screws into the front face of the support member, each screw being inserted at said acute angle ($\alpha$) with respect to a normal to the front face and engaging a depression formed in the cutter portion.

5. The method in accordance with claim 4, comprising inserting at least four screws into the front face of the support member, each screw being inserted at said acute angle ($\alpha$) with respect to a normal to the front face and engaging a depression formed in the cutter portion.

6. The method in accordance with claim 4, comprising, during positioning, aligning a protrusion protruding from the outer peripheral surface of the support member with an indent formed on the inner surface of the cutter portion, and inserting the outer peripheral surface of the body portion into the annular ring of the cutter portion.

7. The method in accordance with claim 1, comprising inserting at least two screws into the front face of the support member, each screw being inserted at said acute angle ($\alpha$) with respect to a normal to the front face and engaging a depression formed in the cutter portion.

8. The method in accordance with claim 7, comprising inserting at least four screws into the front face of the support member, each screw being inserted at said acute angle ($\alpha$) with respect to a normal to the front face and engaging a depression formed in the cutter portion.

9. The method in accordance with claim 7, comprising, during positioning, aligning a protrusion protruding from the outer peripheral surface of the support member with an indent formed on the inner surface of the cutter portion, and inserting the outer peripheral surface of the body portion into the annular ring of the cutter portion.

10. The method in accordance with claim 1, further comprising mounting cutting inserts into the recesses.

11. The method in accordance with claim 1, further comprising providing the recesses with cutting insert receiving cartridges.

12. The method in accordance with claim 11, further comprising mounting cutting inserts in the cutting insert receiving cartridges.

13. The method in accordance with claim 11, comprising securing the cutting insert receiving cartridges to the recesses with screws.

14. The method in accordance with claim 11, comprising providing the recesses with left-hand cutting insert receiving cartridges.

15. The method in accordance with claim 11, comprising providing the recesses with right-hand cutting insert receiving cartridges.

16. The method in accordance with claim 11, comprising providing the recesses with both left-hand and right-hand cutting insert receiving cartridges.

17. The method in accordance with claim 1, comprising providing a body portion having a central portion provided with an S-type adapter.

18. The method in accordance with claim 1, comprising providing a body portion having a central portion provided with an F-type adapter.

19. A method for assembling a metal-cutting slotting cutter comprising:
   providing a body portion comprising a disk-like support member having a front face, an outer peripheral surface with a first diameter, and a central portion;
   providing a cutter portion comprising an annular ring having an inner surface with a second diameter and an outer portion provided with recesses;
   aligning a protrusion protruding from the outer peripheral surface of the support member with an indent formed on the inner surface of the cutter portion;
   inserting the outer peripheral surface of the body portion into the annular ring of the cutter portion to thereby position the body portion inside the cutter portion; and
   inserting a securing member into at least one bore formed in the support member to thereby help secure the support portion to the cutter portion, said at least one bore having a longitudinal axis that extends at an angle oblique to a rotary axis (R) of the body portion.

20. The method in accordance with claim 19, further comprising applying heat to the cutter portion prior to inserting the outer peripheral surface of the body portion into the annular ring of the cutter portion.

21. The method in accordance with claim 20, wherein the first diameter is larger than the second diameter.

22. The method in accordance with claim 21, comprising inserting a securing member into each of at least two separate bores formed in the support member, each bore having a longitudinal axis that extends at an angle oblique to a rotary axis (R) of the body portion.

23. The method in accordance with claim 22, comprising inserting a securing member into each of at least four separate bores formed in the support member, each bore having a longitudinal axis that extends at an angle oblique to a rotary axis (R) of the body portion.

24. The method in accordance with claim 22, wherein the securing member is a screw that is inserted into the front face of the support member, at an acute angle ($\alpha$) with respect to a normal to the front face, such that the screw emerges from the outer peripheral surface of the support member and engages a depression formed in the cutter portion, to thereby help secure the support portion to the cutter portion.

25. The method in accordance with claim 19, comprising inserting a securing member into each of at least two separate bores formed in the support member, each bore having a longitudinal axis that extends at an angle oblique to a rotary axis (R) of the body portion.

26. The method in accordance with claim 21, wherein the securing member is a screw that is inserted into the front face of the support member, at an acute angle (α) with respect to a normal to the front face, such that the screw emerges from the outer peripheral surface of the support member and engages a depression formed in the cutter portion, to thereby help secure the support portion to the cutter portion.

27. The method in accordance with claim 19, further comprising mounting cutting inserts into the recesses.

28. The method in accordance with claim 19, further comprising providing the recesses with cutting insert receiving cartridges.

29. The method in accordance with claim 28, further comprising mounting cutting inserts in the cutting insert receiving cartridges.

30. The method in accordance with claim 28, comprising securing the cutting insert receiving cartridges to the recesses with screws.

31. The method in accordance with claim 28, comprising providing the recesses with left-hand cutting insert receiving cartridges.

32. The method in accordance with claim 28, comprising providing the recesses with right-hand cutting insert receiving cartridges.

33. The method in accordance with claim 28, comprising providing the recesses with both left-hand and right-hand cutting insert receiving cartridges.

34. The method in accordance with claim 19, comprising providing a body portion having a central portion provided with an S-type adapter.

35. The method in accordance with claim 19, comprising providing a body portion having a central portion provided with an F-type adapter.

36. A method for assembling a metal-cutting slotting cutter comprising:

providing a body portion comprising a disk-like support member having a front face, an outer peripheral surface with a first diameter, and a central portion;

providing a cutter portion comprising an annular ring having an inner surface with a second diameter and an outer portion provided with recesses;

applying heat to the cutter portion to thereby cause an expansion of the annular ring;

aligning a protrusion protruding from the outer peripheral surface of the support member with an indent formed on the inner surface of the cutter portion;

inserting the outer peripheral surface of the body portion into the annular ring of the cutter portion to thereby position the body portion inside the cutter portion; and inserting a securing member into at least one bore formed in the support member to thereby help secure the support portion to the cutter portion, said at least one bore having a longitudinal axis that extends at an angle oblique to a rotary axis (R) of the body portion.

37. A method for assembling a metal-cutting slotting cutter comprising:

providing a body portion comprising a disk-like support member having a front face, an outer peripheral surface with a first diameter, and a central portion;

providing a cutter portion comprising an annular ring having an inner surface with a second diameter and an outer portion provided with recesses;

applying heat to the cutter portion to thereby cause an expansion of the annular ring;

aligning a protrusion protruding from the outer peripheral surface of the support member with an indent formed on the inner surface of the cutter portion; and inserting the outer peripheral surface of the body portion into the annular ring of the cutter portion to thereby position the body portion inside the cutter portion.

38. The method according to claim 37, wherein providing a body portion comprises:

forming a bore at the periphery of the support member; and forcibly urging a pin into the bore formed at the periphery of the support member so that part of the pin protrudes beyond the support member's outer peripheral surface, to thereby form said protrusion.

39. The method according to claim 37, wherein providing a body portion comprises:

forming the support member with a radially extending lip.

* * * * *